US006748445B1

(12) United States Patent
Darcy et al.

(10) Patent No.: US 6,748,445 B1
(45) Date of Patent: Jun. 8, 2004

(54) SYSTEM AND METHOD FOR EXCHANGING DATA

(75) Inventors: Paul B. Darcy, Redmond, WA (US); Steven A. DeLuca, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/496,158

(22) Filed: Feb. 1, 2000

(51) Int. Cl.$^7$ ................................................ G06F 15/16
(52) U.S. Cl. .................. 709/237; 709/232; 709/233; 709/224; 370/468
(58) Field of Search ................................ 709/224, 235, 709/236, 234, 233, 200, 237, 232; 370/468; 379/229

(56) References Cited

U.S. PATENT DOCUMENTS

| | | | | |
|---|---|---|---|---|
| 4,413,341 A | * | 11/1983 | Markhasin et al. | 714/699 |
| 4,539,679 A | * | 9/1985 | Bux et al. | 370/405 |
| 5,130,986 A | * | 7/1992 | Doshi et al. | 370/231 |
| 5,359,599 A | * | 10/1994 | Destouesse et al. | 370/390 |
| 5,734,642 A | | 3/1998 | Vaishnavi et al. | |
| 5,751,963 A | * | 5/1998 | Umetsu | 709/223 |
| 5,802,303 A | * | 9/1998 | Yamaguchi | 709/224 |
| 5,883,924 A | * | 3/1999 | Siu et al. | 375/226 |
| 6,021,124 A | * | 2/2000 | Haartsen | 370/336 |
| 6,067,300 A | * | 5/2000 | Baumert et al. | 370/413 |
| 6,088,734 A | * | 7/2000 | Marin et al. | 709/232 |
| 6,105,064 A | * | 8/2000 | Davis et al. | 709/224 |
| 6,128,282 A | * | 10/2000 | Liebetreu et al. | 370/235 |
| 6,205,151 B1 | * | 3/2001 | Quay et al. | 370/416 |
| 6,226,290 B1 | * | 5/2001 | Salett et al. | 370/389 |
| 6,292,490 B1 | * | 9/2001 | Gratacap et al. | 370/412 |
| 6,400,819 B1 | * | 6/2002 | Nakano et al. | 379/229 |
| 6,421,387 B1 | * | 7/2002 | Rhee | 375/240.27 |
| 6,442,141 B1 | * | 8/2002 | Borella et al. | 370/248 |
| 6,505,253 B1 | * | 1/2003 | Chiu et al. | 709/235 |
| 6,519,263 B1 | * | 2/2003 | Huth | 370/444 |
| 6,526,070 B1 | * | 2/2003 | Bernath et al. | 370/509 |
| 2002/0018473 A1 | * | 2/2002 | Hassell et al. | 370/395.1 |
| 2002/0041606 A1 | * | 4/2002 | Chin et al. | 370/468 |
| 2002/0099681 A1 | * | 7/2002 | Gainey et al. | 707/1 |

FOREIGN PATENT DOCUMENTS

EP          0 458 033          11/1991

OTHER PUBLICATIONS

ATM local area network, Peter Newman, Mar. 1994, IEEE, pp. 86–98.*
Stephen F. Bush et al., Network Management of Predictive Mobile Networks, Papers on RDRN at the ITTC of the University of Kansas, 33 pages, Jul. 1997.

* cited by examiner

*Primary Examiner*—Krisna Lim
(74) *Attorney, Agent, or Firm*—Shook Hardy & Bacon, L.L.P.

(57) ABSTRACT

A system and method are provided for exchanging data at irregular intervals between a sender and a receiver. The sender transmits to the receiver reports containing subject data along with information regarding the next interval at which subject data will be transmitted to the receiver. The receiver may create an expectation window corresponding to the interval information. In a network environment, the level of non-management traffic is monitored, and an average interval value for exchanging management data is selected as a function of the level of non-management traffic. Then, interval values are randomly generated based on the selected average interval value, and the management data is transmitted from the sender to the receiver at irregular intervals corresponding to the interval values.

8 Claims, 7 Drawing Sheets

SYSTEM AND METHOD FOR EXCHANGING DATA

TECHNICAL FIELD

The present invention relates generally to an improved system and method for exchanging data and, more particularly, to a system and method for scheduling the exchange of data at irregular intervals.

BACKGROUND OF THE INVENTION

Many corporate computer networks carry management traffic as well as ordinary business traffic. For example, the network may include one or more management nodes which communicate with various managed objects for the purpose of collecting management data from the objects, such as the status of the object. Many network administrators would consider a volume of management traffic exceeding 5% of the total network traffic to be an inefficient use of the network, and maintaining management traffic at no more than 2–3% of total network traffic is preferable.

Many conventional computer networks control management traffic by polling each of the managed objects at regular intervals. Upon receiving the polling message from the management node, each of the managed objects sends a response to the management node with the requested data. Other networks are configured such that the management objects initiate data messages at regular intervals. In that case, the management node returns an acknowledgment message to each of the managed objects upon receiving the data message. Accordingly, the exchange of management data in conventional computer networks usually occurs at regular intervals and typically involves bilateral communication between the management node and the managed objects.

In corporate computer networks, the ordinary business traffic (i.e., nonmanagement traffic) oftentimes follows a predictable pattern. For example, traffic is relatively high starting around 9:00 a.m. and may taper off slightly over the lunch hour. Then, during the afternoon, network traffic is again relatively high. By 5:00 p.m. or so, network traffic starts to drop off dramatically and remains extremely low until about 8:00 a.m. the next business day.

By contrast, management traffic on a corporate computer network may or may not follow any pattern. One problem with conventional computer networks is that non-critical management traffic takes place at the same time the network is experiencing peak business traffic. Moreover, spikes in management traffic sometimes occur when a management node simultaneously issues polling messages to multiple management objects or when a plurality of managed objects respond to the management node at about the same time. It is not uncommon in a conventional computer network for spikes in management traffic to occur during peak periods of business traffic, especially where polling occurs at regular intervals. When spikes in management traffic coincide with peaks in business traffic, it is likely that the overall network traffic will be excessive and cause all network communications to be degraded. In some networks, signs of degradation may occur when overall traffic is as low as 65% of the network capacity.

Thus, there is a need for a computer network in which the occurrence of management traffic spikes during peak traffic periods is reduced or eliminated. There is also a need for a computer network in which the volume of management traffic is minimized by reducing or eliminating the requirement for bilateral communication between a management node and a plurality of managed objects.

SUMMARY OF THE INVENTION

The present invention is directed to a method for exchanging data at irregular intervals between a sender and a receiver which includes generating a plurality of interval values. The method also includes transmitting data to be exchanged along with an interval value from the sender to the receiver. The interval value sent to the receiver indicates the interval between a transmitting step and a subsequent transmitting step. The method also includes subsequently transmitting data to be exchanged from the sender to the receiver substantially at the interval indicated by the interval value.

In another aspect, the present invention is directed to a computer network which includes a receiver node and at least one sender node coupled with the receiver node over the network. The sender node is configured to send reports to the receiver node at irregular intervals. The reports include information regarding the time intervals at which the first sender node will send subsequent reports to the receiver node.

Yet another aspect of the present invention is a method for exchanging data between a sender and a receiver over a communications link which includes receiving from the sender data indicative of an interval at which a report will be sent. The method further includes creating an expectation window for receiving the report from the sender during a time period which includes the interval. Finally, the method includes opening the expectation window during the time period.

The present invention is also directed to a method for exchanging management data between a sender and a receiver over a communications link. This method includes monitoring the level of non-management traffic over the communications link and selecting a desired average interval for exchanging management data between the sender and the receiver as a function of the level of nonmanagement traffic over the communications link. The method also includes generating a plurality of irregular interval values as a function of the selected average interval value and transmitting management data from the sender to the receiver at irregular time intervals corresponding to the generated interval values.

In a further aspect, the present invention provides a method for exchanging data between a sender and a receiver which includes generating a first schedule at the sender for sending data to the receiver and generating a second schedule at the receiver for receiving data from the sender. The second schedule is generated as a function of the first schedule to cause a predetermined probability of failure. Upon detecting a failure, an event is generated at the receiver.

The present invention is also directed to a computer-readable medium having a data structure stored thereon. The data structure has a first data field containing subject data for transmission from a sender to a receiver. The data structure also has a second data field containing interval data representing a time interval for subsequent transmission of subject data from the sender to the receiver.

BRIEF DESCRIPTION OF THE DRAWING

The present invention is described in detail below with reference to the attached drawing figures, wherein.

DETAILED DESCRIPTION OF THE INVENTION

Figure 1:
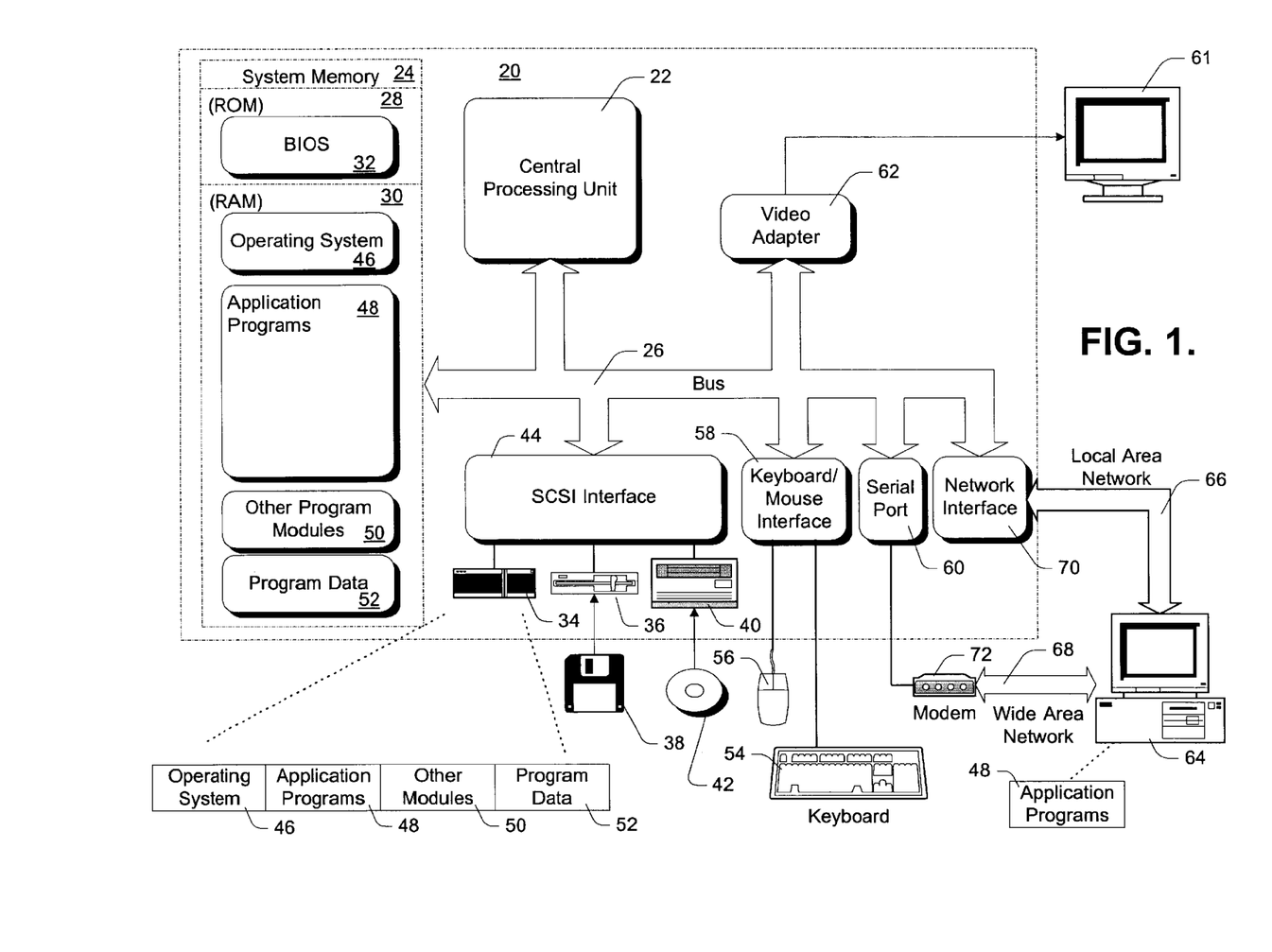
FIG. 1 is a block diagram of a computing system environment suitable for use in implementing the present invention.

The present invention is directed to a system and method for scheduling the exchange of data at irregular intervals. FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 1 illustrates operating system 46, application programs 48, other program modules 50, and program data 52.

The computer 20 may also include other removable/non-removable, volatile/nonvolatile computer storage media. By way of example only, FIG. 1 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 1, provide storage of computer readable instructions, data structures, program modules and other data for the computer 20. In FIG. 1, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 1. The logical connections depicted in FIG. 1 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 1 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 50 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 2:
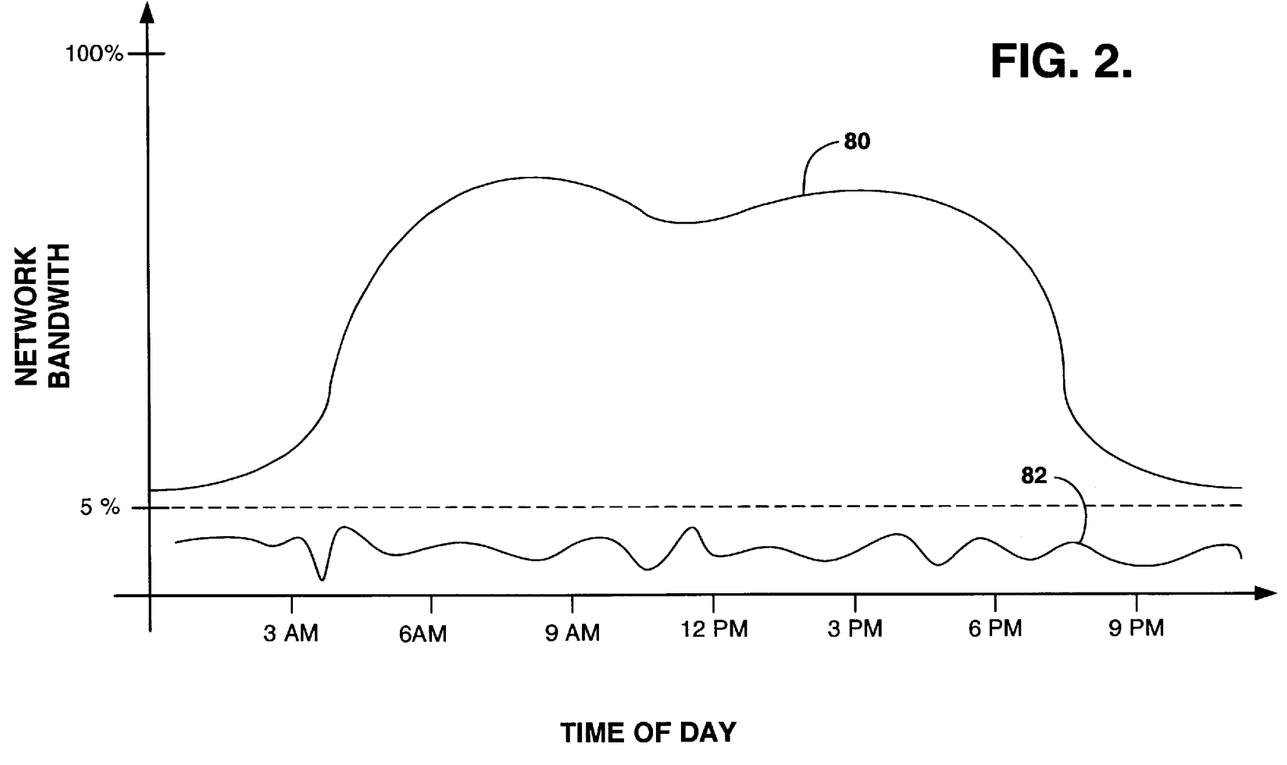
FIG. 2 is a diagram illustrating network usage as a percentage of network bandwidth capacity over time for a typical corporate computer network, wherein the top curve represents the network's non-management business traffic and the bottom curve represents the network's management traffic.

Referring next to FIG. 2, typical network bandwidth usage for a conventional corporate computer network is shown over the course of a normal business day. An upper curve 80 represents the normal business traffic (i.e., non-management traffic) on the network, and a lower curve 82 represents the management traffic on the network. The total network traffic can be obtained by combining the curves 80, 82. As shown in FIG. 2, the ambient or normal business traffic is relatively low in the early morning hours and climbs rapidly until 8 a.m. or so. Then, the ambient network traffic remains high until about 5 p.m. with a small decrease in traffic over the lunch hour. Ambient traffic drops dramatically after 6 p.m. and remains low until the next morning.

Even though the level of management traffic as shown by the curve 82 preferably remains below 5% of the available network bandwidth, it is typically more dynamic than the level of ambient traffic. In part, this is due to the conventional method of reporting management data at regular intervals and then acknowledging its receipt, which can result in frequent spikes in management traffic. For example, if a large number of remote servers simultaneously send management data to a central management machine at 10 minute intervals, there will be a spike in the level of management traffic every 10 minutes. Moreover, if the central management machine acknowledges receipt of each report, another spike in the level of management traffic will occur. It is not uncommon for spikes resulting from regular polling intervals to coincide with peak levels of non-management traffic because regular polling occurs over and over throughout the day.

Figure 3:
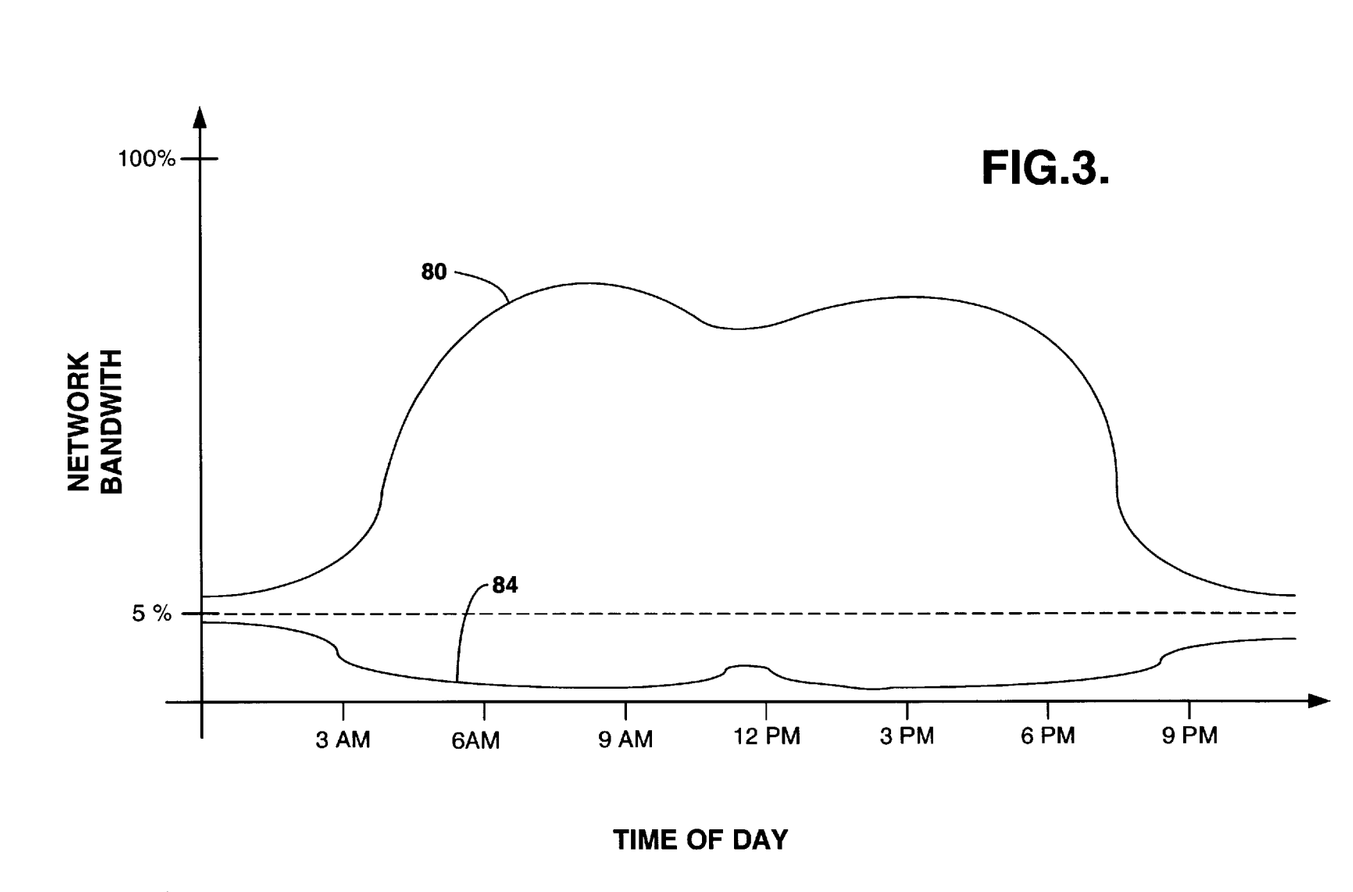
FIG. 3 is a diagram similar to FIG. 2 but illustrating network usage for a computer network operating in accordance with a preferred embodiment of the present invention such that the network's management traffic is generally inversely proportional to the network's non-management traffic.

In FIG. 3, a lower curve 84 represents the management traffic for a computer network incorporating a preferred embodiment of the present invention and carrying the same ambient traffic (curve 80) as the network of FIG. 2. As described below in greater detail, the volume and/or frequency of the management traffic is preferably manipulated so that the level of management traffic is inversely proportional to the level of ambient or non-management traffic. For example, as shown in FIG. 3, peak management traffic occurs between 9 p.m. and 3 a.m., which coincides with the minimum level of ambient traffic. Similarly, minimum management traffic occurs between 6 a.m. and 11 a.m. and again between 1 p.m. and 6 p.m., which coincides with the periods of peak ambient traffic. Maintaining the management traffic inversely proportional to the ambient traffic advantageously reduces the overall network bandwidth during peak periods, thereby reducing the likelihood of network degradation.

Figure 4:
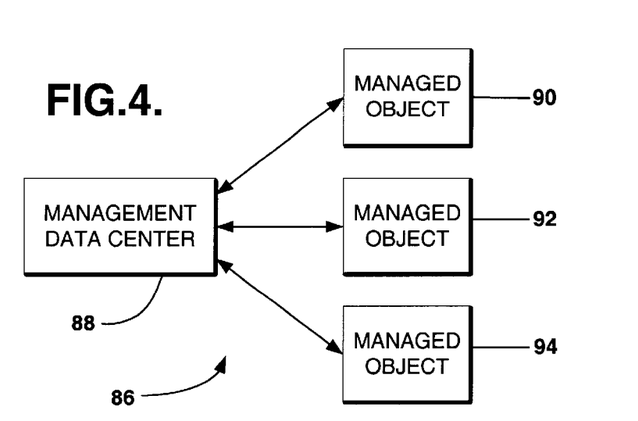
FIG. 4 is a block diagram of a computer network including a management data center which communicates with a plurality of managed objects.

An exemplary computer network 86 is shown in FIG. 4 which includes a management data center 88 and a plurality of managed objects 90, 92 and 94. The data center 88 is adapted for bilateral communication over the network with each of the managed objects 90, 92 and 94. In this example, the data center 88 monitors the status of each of the managed objects, and the network 86 carries the same level of ambient traffic shown by the curve 80 in FIGS. 2 and 3. Conventionally, the managed objects send a status report to the data center every 10 minutes, and the data center promptly acknowledges receipt of each status report. Alternatively, in a conventional network, the managed objects send status reports to the data center in response to status requests from the data center. By contrast, a network operating in accordance with the present invention utilizes irregular reporting intervals and provides the data center with an indication of the next interval well in advance of the next report, thereby eliminating the requirement for bilateral communication.

Figure 7:
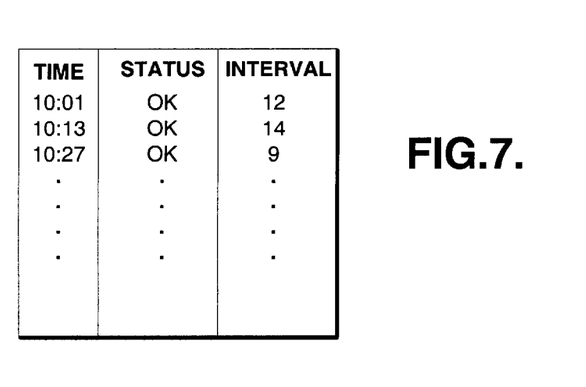
FIG. 7 is a table illustrating an exemplary record of reports containing the data structure of FIG. 6.

As shown in FIG. 7, the managed object 90 sends a status report to the data center 88 at 10:01 which indicates both its status (e.g., "OK") and the time interval until the next report (e.g., 12 minutes). Then, at 10:13, the object 90 sends another status report indicating both the status of the object and the time interval until the next report (e.g., 14 minutes). Similarly, at 10:27, the object 90 sends yet another status report indicating that its status remains "OK" and informing the data center 88 that the next report will be sent in nine minutes.

Figures 5, 6:
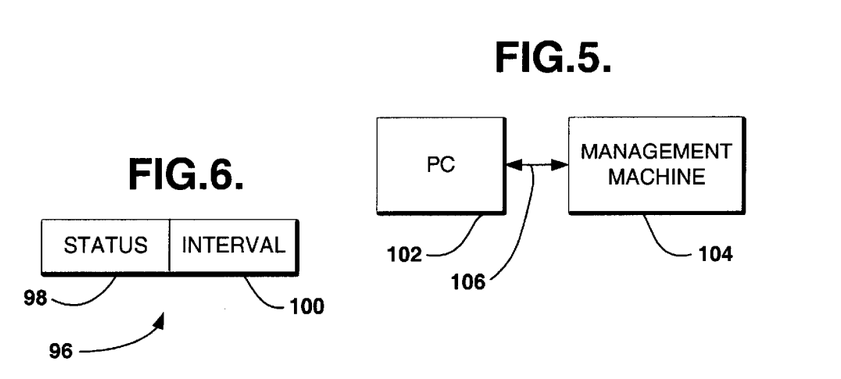
FIG. 5 is a block diagram of a personal computer and a management machine which are connected to one another by a communications link.
FIG. 6 is a block diagram of a data structure according to a preferred embodiment of the present invention.

According to a preferred embodiment of the present invention, the reports from the managed objects to the data center contain a data structure 96 shown in FIG. 6. The data structure 96 includes a status field 98 and an interval field 100. Preferably, the status field indicates that the managed object is "OK", "ON", "OFF", etc., and the interval field indicates the number of minutes until the next report. Of course, the status field 98 could contain any amount of data, including a large, detailed status data file with thousands of fields.

Those skilled in the art will appreciate that a given report may contain any number of interval values. For example, referring again to FIG. 7, the report at 10:01 could have included two interval values (e.g., 12 and 14), in which case the report at 10:13 would not necessarily include any interval values. In other cases, it may be desirable to generate and transmit interval values hourly so that all of the interval values for the upcoming hour are sent to the receiver with the last report for the current hour. Moreover, the same random schedule could be reused every hour.

Figure 8:
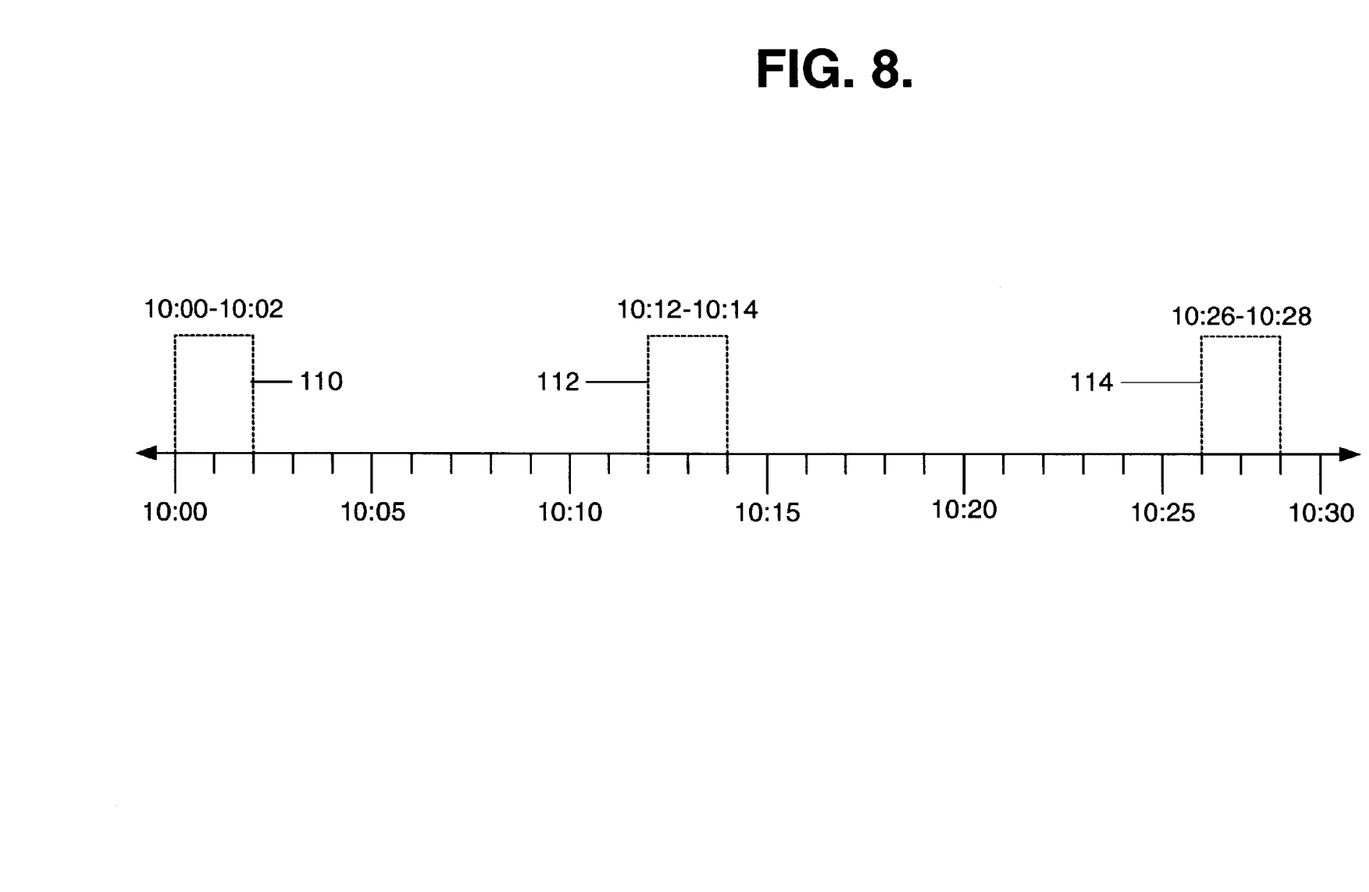
FIG. 8 is a diagram illustrating the occurrence of expectation windows corresponding to the exemplary record of FIG. 7.

Upon receiving a status report from the managed objects containing interval information, the data center 88 is configured to create an expectation window encompassing the time at which the next status report is expected. As shown in FIG. 8, an expectation window 110 corresponding to the 10:01 report (FIG. 7) spans from 10:00 through 10:02. Similarly, an expectation window 112 corresponding to the 10:13 report extends from 10:12 through 10:14, and an expectation window 114 corresponding to the 10:27 report spans from 10:26 through 10:28. Although two-minute windows are shown in FIG. 8, the optimal duration for an expectation window may vary depending upon a number of circumstances, such as the average time between reports and the characteristics of the network, the data center, the managed objects and the report.

If one or more reports are not received at the data center 88 during their respective expectation windows, the data center 88 may generate an event. For example, the data center may be configured to send a status inquiry to the object 90 upon detecting that a report was not timely received. Alternatively, the data center may respond by triggering an alarm. Depending on the circumstances, the data center 88 could also be configured to count the number of failures and respond only after a certain number (e.g., three) consecutive failures by the same managed object. Thus, the data center 88 operates in a passive or quiet mode unless the expected data is not timely received, thereby substantially reducing the management traffic over the network 86 when compared to a network which requires bilateral communication for polling applications. Messages sent over a network contain a protocol component in addition to the underlying data. It is not uncommon for the protocol component to occupy 25% of the message. Therefore, eliminating the need for a large number of status inquiries or acknowledgements from the data center substantially reduces the overall network bandwidth usage not only because of the savings in transferring the underlying data, but also because of the savings in protocol which would be required in a conventional, synchronous network.

With reference to FIG. 5, the present invention is also useful in managing non-critical communications between a personal computer (PC) 102 and a management machine 104 over a communications link 106. For example, if the management machine 104 is a database and an application program running on the PC 102 requests non-critical data from the database, the present invention may be utilized to advantageously transfer the data from the database 104 to the PC 102 without interfering with other processes. Rather than monitor network bandwidth as discussed above with respect to FIGS. 2–4, in the environment of FIG. 5 the present invention monitors some other metric, such as the utilization rate of either the memory or the central processing unit (CPU) of the PC 102. In other words, if the memory (or CPU) utilization rate is low, the non-critical data may be sent immediately. Otherwise, the data may be "drizzled" down to the PC, or transmission may simply be delayed until a later time.

As with the network 86 of FIG. 4, the present invention adjusts the volume and frequency of data exchanged between the management machine 104 and the PC 102 so that it is inversely proportional to the selected metric (e.g., CPU utilization). Accordingly, the metric is monitored and data is transmitted at irregular intervals. Data packets from the machine 104 may include an indication of the time interval at which the next data packet will be sent. The PC 102 may create expectation windows for receiving the packets (e.g., in response to the time intervals received from the machine 104). However, if the average interval for transmitting packets to the PC 102 is relatively short, such as one second, it may not be an efficient use of the PC's resources to create expectation windows for every packet.

Figure 9:
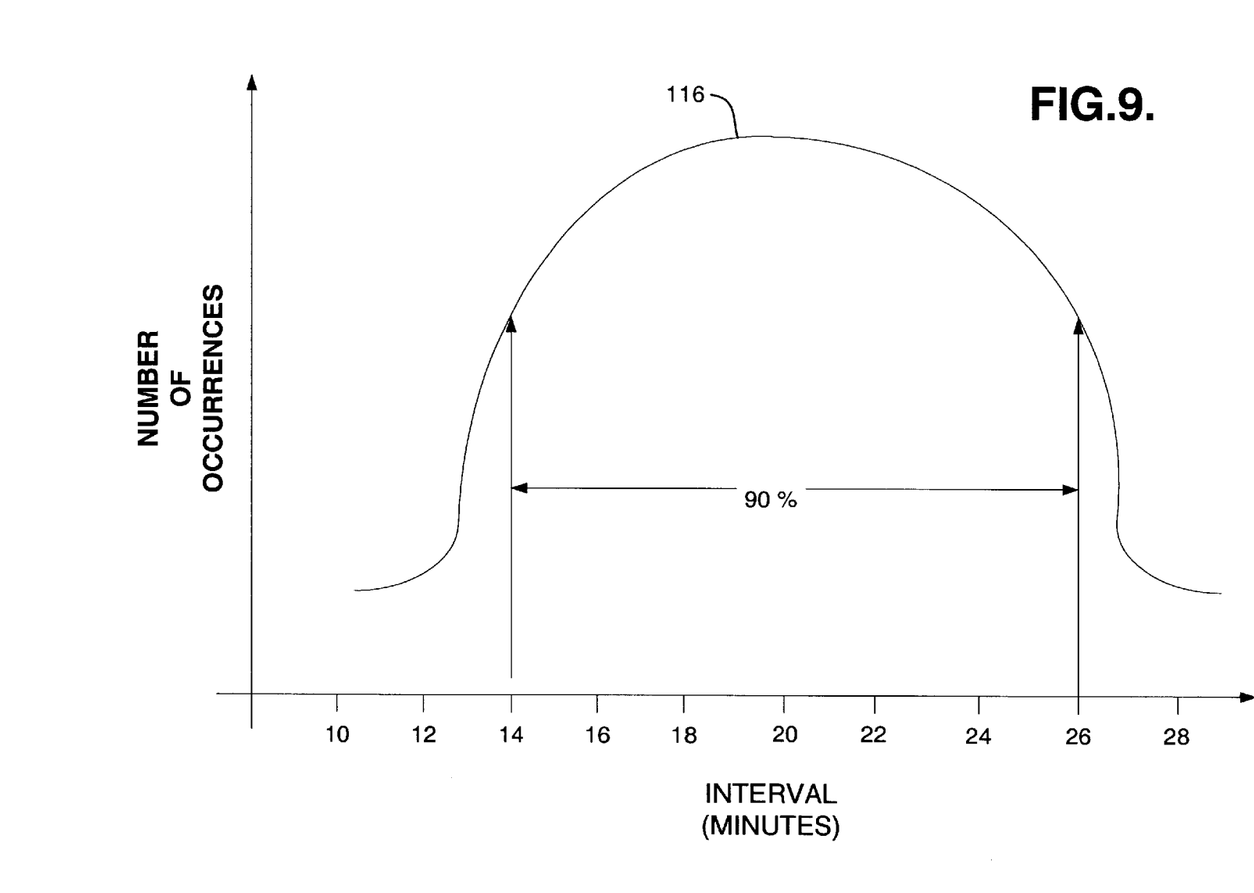
FIG. 9 is a diagram illustrating the statistical probability of randomly obtaining values from a distribution with a seed number which represents the length of the average reporting interval.

In use, the present invention generates a number of interval values which will be contained in the reports from the managed objects to the data center of the network. Preferably, these interval values are generated by first selecting a desired average interval for sending reports, also referred to herein as a "seed number." Then, as shown in FIG. 9, a "distribution" of interval values is generated as a function of the seed number representing the average interval for the distribution. As understood by those skilled in the art, the shape of the distribution defines the statistical probability of the particular interval values being randomly selected, and there are many possible shapes and many possible seed numbers for such a distribution. For example, a distribution 116 depicted in FIG. 9 is based on an average interval of 20 minutes, and there is a 90% likelihood that randomly selected interval values would fall between 14 and 26, inclusive. However, it would also be possible to provide a distribution based on an average interval of 20 minutes having a 95% likelihood that randomly selected interval values would be greater than or equal to 14 and less than or equal to 26.

Using the distribution 116 from FIG. 9, the managed object 90 randomly selects a first interval value and transmits that value to the data center 88 along with the management data so that the data center will expect to receive the next set of management data at a time interval which corresponds to the first interval value. Then, when the managed object 90 sends its next report, the object 90 randomly selects a second interval value and transmits that value to the data center 88 along with the management data in the next report. This process may be repeated indefinitely and thus provides for the asynchronous transmission of multiple reports from a managed object to a management data center at irregular intervals. Consequently, even if each of the managed objects 90, 92 and 94 employs the same distribution of interval values based on the same average interval, it is still unlikely that the transmission of management reports would occur simultaneously.

There are several ways to select an initial seed number or average interval value. Some network administrators estimate that an average interval of 5–15 minutes is generally acceptable for regular polling of management data, and an initial seed number such as 10 could be used as a default value. Alternatively, historical data may exist which suggests an appropriate initial average interval value. When the interval values are randomly generated, it may be appropriate to initially double the typical average interval (e.g., from 10 minutes to 20 minutes) for non-critical data. Alternatively, the initial seed value may simply be selected as a function of the current network bandwidth utilization.

Figure 10:
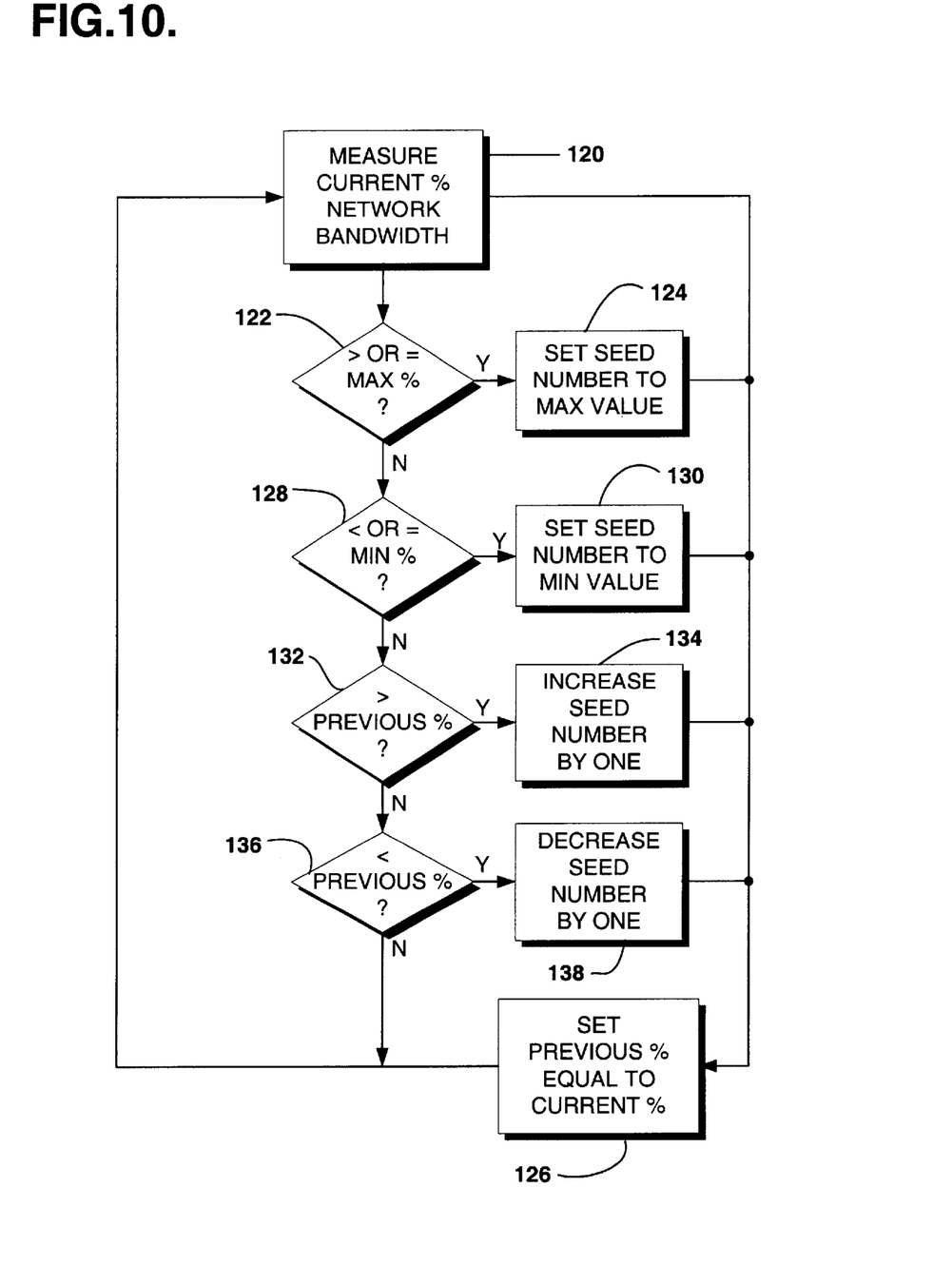
FIG. 10 is a flowchart representative of a computer program for adjusting the seed number as a function of network bandwidth.

In any event, as set forth in FIG. 10, the seed number may be adjusted as a function of the current level of ambient network traffic. First, the current network bandwidth percentage for ambient traffic is measured at step 120. Then, control passes to step 122, which determines whether the current percentage of bandwidth is greater than or equal to a predetermined maximum percentage. If so, the seed number is set to its maximum value at step 124. Assigning maximum values for the network bandwidth and for the seed number reduces the likelihood that the overall network bandwidth will exceed its capacity and ensures a minimum reporting frequency. Next, the current percentage is saved in memory as the previous percentage at step 126 before returning to step 120.

On the other hand, if the current network bandwidth percentage is less than the maximum percentage, then control passes to step 128 to determine whether the current percentage is less than or equal to a predetermined minimum percentage. If so, the seed number is set to its minimum value at step 130. Assigning minimum values for the network bandwidth and for the seed number ensures that the management traffic will not be increased beyond the maximum reporting frequency. Then, at step 126, the previous percentage is set to the current percentage, and the current percentage is measured again at step 120.

If the current percentage is less than the maximum percentage and greater than the minimum percentage, the current percentage is compared to the previous percentage at step 132. If the current percentage is greater than the previous percentage, then the seed number is increased by one at step 134. However, if the current percentage is determined at step 136 to be less than the previous percentage, then the seed number is decreased by one at step 138. In either case, the previous percentage is set equal to the current percentage at step 126 prior to again measuring the current percentage at step 120. If the current percentage is equal to the previous percentage, control simply passes back to step 120. By increasing and decreasing the seed value in response to the current percentage of ambient bandwidth, the management traffic is maintained at a level which is generally inversely proportional to the non-management traffic.

As mentioned above, expectation windows may be created at the data center 88 upon receiving reports from the managed object 90 containing interval information for the next report from the object 90. Alternatively, expectation windows may be generated at the data center 88 using a distribution such as the one shown in FIG. 9. That is, the managed object 90 generates interval values based on a first seed number and a first distribution, and the data center 88 generates interval values based on a second seed number and a second distribution. The first seed number may or may not be equal to the second seed number, and the first distribution may or may not have the same shape as the second distribution. The managed object 90 transmits the polling or management data according to its randomly produced interval values, and the data center 88 creates expectation windows according to its randomly produced interval values. In this embodiment, the report from the object 90 need not contain any interval information.

In a preferred embodiment of the present invention, there is a relationship between the first and second distributions which ensures a high probability that the reports from the object 90 will be received within the expectation windows at the data center 88. As an example, if the first and second seed numbers are both equal to 20, those skilled in the art could construct two distinct but similarly shaped distributions which overlap by approximately 95%. Similarly, if the first seed number is 20 and the second seed number is 21, those skilled in the art could construct first and second distributions which overlap by 95%. Similarly, the duration of the expectation windows may be adjusted to increase the odds of receiving each report in a timely fashion. In any event, the seed numbers, the shapes of the distributions and the length of the expectation windows can be manipulated to alter the statistical probability that each report from the object 90 will be received by the data center 88 while the expectation window is open. With an overlap between the bell curves of 95%, for example, 19 of every 20 reports should be successfully received.

One benefit to causing a predetermined probability of failure is that it forces occasional communication from the data center 88 to the managed object 90. In some networks, a daily synchronization of network element clocks occurs simultaneously (e.g., at midnight) and results in a large spike in management traffic. Effecting a periodic failure may eliminate the need for a daily synchronization of network elements, and thus eliminate the resulting spike, because it allows the devices to periodically resynchronize their clocks relative to one another.

The present invention has been described in connection with an exemplary computer network which is intended to be illustrative rather than restrictive. For example, the communications described above between the data center 88 and the object 90 are also applicable to the objects 92, 94 and to any number of other managed objects. Similarly, the computer network may have more than one data center or receiving node. The present invention has application in any environment in which a large number of servers are instantaneously managed (e.g., Internet services, mail, file servers), in any network with a large amount of latent data which is transferred over the network throughout the day and in many other environments, such as a PC which communicates with a management machine.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. A method for exchanging management data between a sender and a receiver over a communications link, said method comprising:

monitoring the level of non-management traffic over the communications link;

selecting a desired average interval for exchanging management data between the sender and the receiver as a function of the level of non-management traffic over the communications link;

generating a plurality of irregular interval values as a function of the selected average interval value; and transmitting management data from the sender to the receiver at irregular time intervals corresponding to the generated interval values.

2. The method of claim 1, wherein the communications link is a network.

3. The method of claim 2, wherein said monitoring step includes measuring the network bandwidth.

4. The method of claim 3, wherein said selecting step includes selecting the seed number so that the management traffic is inversely proportional to the non-management traffic.

5. The method of claim 1, wherein the sender is a personal computer and the receiver is a management machine.

6. The method of claim 5, wherein the personal computer includes a central processing unit (CPU) and said monitoring step includes measuring the utilization of the CPU.

7. The method of claim 5, wherein the personal computer includes a memory and said monitoring step including measuring the utilization of the memory.

8. One or more computer-readable media having computer-executable instructions for performing the method recited in claim 1.

\* \* \* \* \*